United States Patent [19]
Ecklund

[11] 3,940,199
[45] Feb. 24, 1976

[54] ROTARY CONTACTOR FOR THERMOCOUPLES

[76] Inventor: Oscar Frederick Ecklund, P.O. Box 279, Cape Coral, Fla. 33904

[22] Filed: Jan. 23, 1975

[21] Appl. No.: 543,406

[52] U.S. Cl. ............................. 339/6 R; 339/176 T
[51] Int. Cl.² ......................................... H01R 39/00
[58] Field of Search ........ 339/6 R, 6 A, 176 T, 9 R, 339/9 RY

[56] References Cited
UNITED STATES PATENTS

| | | | |
|---|---|---|---|
| 2,344,192 | 3/1944 | Wantz | 339/176 T |
| 3,654,591 | 4/1972 | Jayaram et al. | 339/176 T X |

Primary Examiner—Roy Lake
Assistant Examiner—DeWalden W. Jones
Attorney, Agent, or Firm—Lockwood, Dewey, Zickert & Alex

[57] ABSTRACT

A rotary contactor for use in conjunction with a thermocouple mounted on a container so as to permit measurement of the temperature of the contents at an interior location while the container is being rotated about a longitudinal axis. The rotary contactor device includes a pair of contact pins one of which has an axially projecting portion and which is formed of a metal corresponding to that of one of the thermocouple materials while the other contact pin is formed of a metal corresponding to the dissimilar thermocouple material. A slip ring concentrically embraces a section of the projecting portion of the one pin and is suitably insulated therefrom while being electrically connected to the other pin. The slip ring is formed of the same metal as the pin to which it is electrically connected. A sleeve bearing and a spring-loaded brush are mounted on the slip ring and are formed of the same metal as the slip ring. A second sleeve bearing and a second spring-loaded brush are mounted directly on a portion of the axially projecting pin and are likewise formed of the same metal as that pin. A pair of flexible electrical conductors connect one set of sleeve bearing and spring-loaded brush to one stationary lead to a potentiometer. This set of flexible conductors and the lead connected thereto are formed of the same metal as the slip ring. A second set of flexible conductors are connected to the sleeve bearing and spring loaded brush mounted directly on the pin and are formed of the same metal as that pin and these conductors are connected to a second lead formed of the same metal and adapted to be connected to a potentiometer.

8 Claims, 7 Drawing Figures

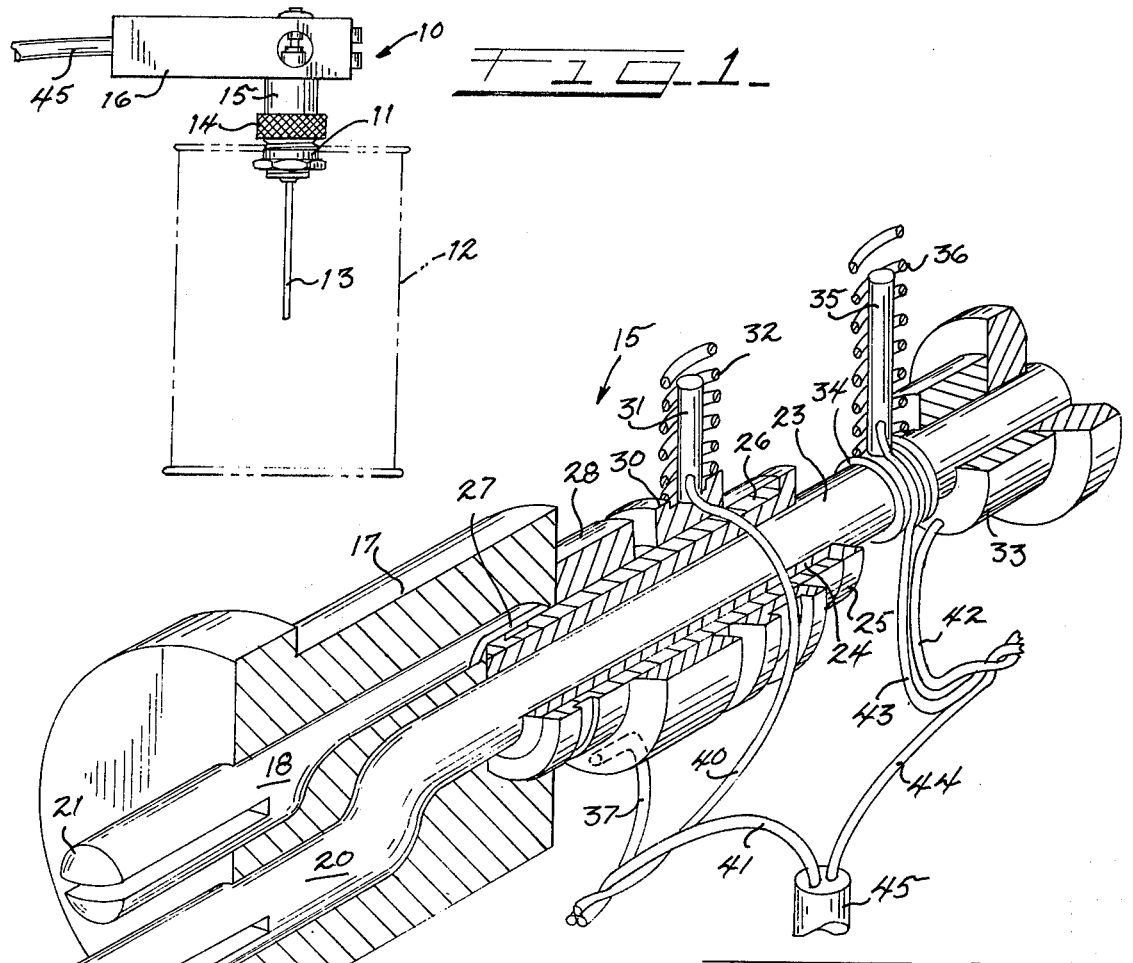
FIG. 1.
FIG. 2.
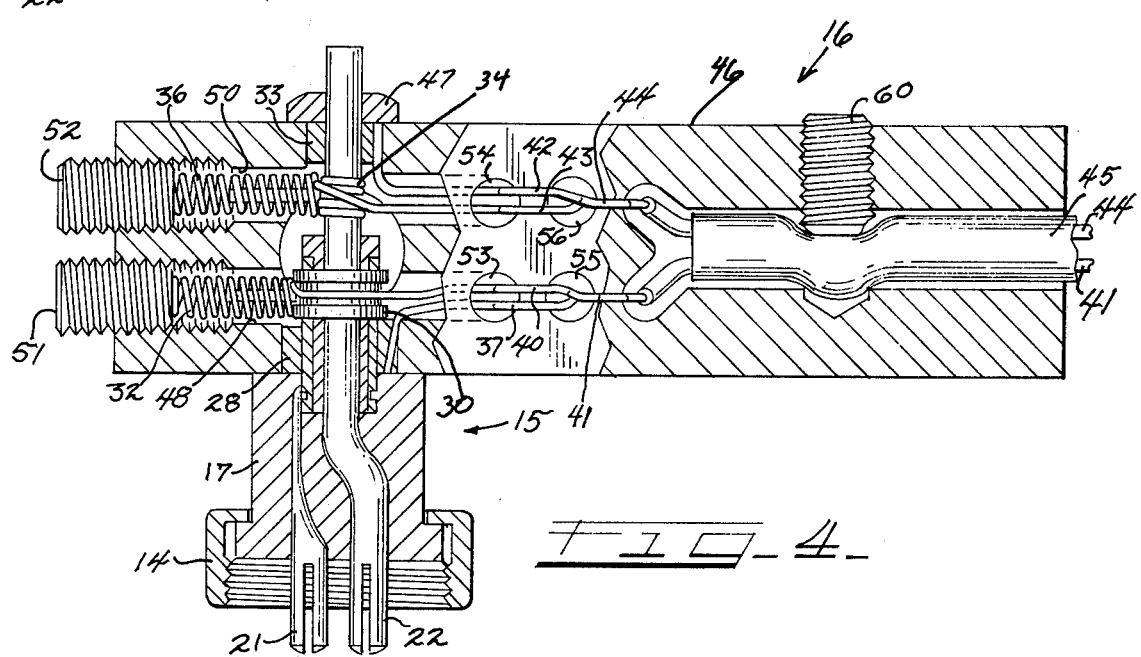
FIG. 4.

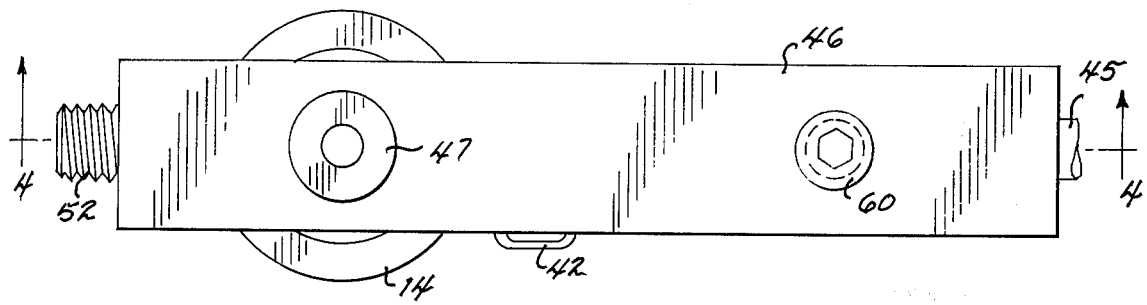
FIG_3_
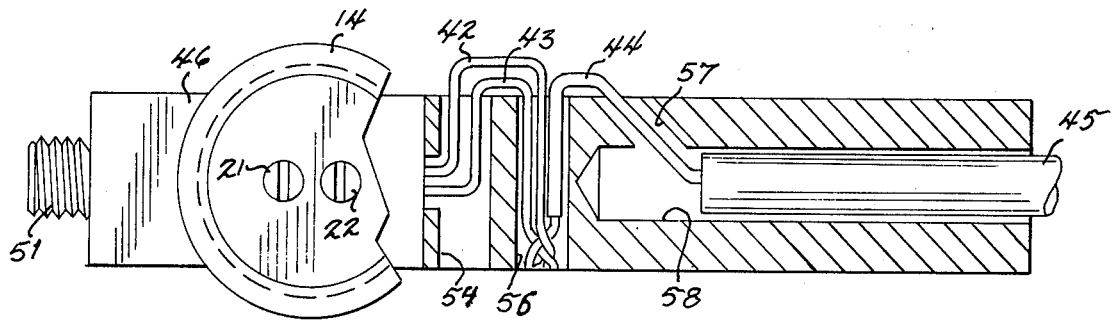
FIG_5_
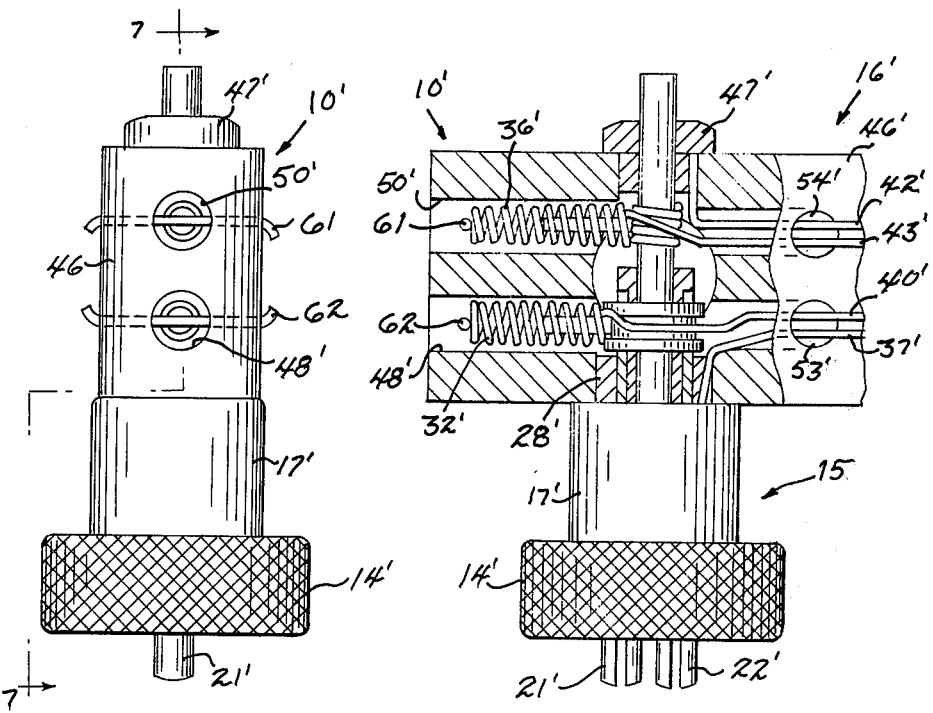
FIG_6_    FIG_7_

ROTARY CONTACTOR FOR THERMOCOUPLES

This invention relates generally to improvements and innovations in rotary contactor units for use in electrically connecting a pair of stationary leads to the terminals of a thermocouple mounted on a rotating container so as to measure the internal temperature of the contents thereof. Devices of this general type are known and have been used commercially, primarily by the food industry.

For reasons of better product quality and reduced processing costs food processors are increasingly using "continuous", "rotary", "hydrostatic", "agitating" and other automatic type retorts for sterilizing their filled cans or jars. Many of these retorts feature a system by which the cans are rotated horizontally about their cylindrical axes to achieve greater agitation of the product in the can. With many products such rotation permits dramatically faster heating, resulting in shorter processing times and improved product quality.

To determine an adequate or "safe" process for a product it is necessary to obtain "heat penetration data" showing the temperature of the slowest heating part of the container contents throughout the heating and cooling cycles. Such data are usually obtained in special experimental retorts designed to simulate the heating and agitation provided by the large commercial retorts. One such retort is the so-called FMC Steritort. This unit can simulate the heating, cooling, shaft rotation and the rolling of the cans in the lower section of the retort that is obtained in several large commercial retorts. Heat penetration tests are made by means of thermocouples which enter one end of the can and extend to its geometric center. A rotary contacting device is connected to the thermocouple at the end of the can so as to permit the can to rotate without twisting the thermocouple lead wires. The lead wires from the rotary device are connected in known manner through a seal in the hollow shaft of the retort, to another slip ring assembly and then to either an indicating or recording potentiometer.

The principal deficiencies in previous rotary contactors have been intermittent electrical conductivity and/or excessive friction which in some cases was enough to stop, or reduce the rolling motion of the can thereby reducing the rate of heating and giving unreliable heat penetration data.

The principal object of the present invention is to provide a reliable rotary contactor of the foregoing type having markedly less rotating friction. This is accomplished in two ways. First, all bearings and brushes are made of thermocouple material and are part of the electrical circuit, so that essentially all rotating friction contributes toward maintaining continuity of the electrical circuit. Because of this arrangement, very minimal loading of the brushes is required, and reasonably satisfactory results can be obtained without the use of the brushes by depending on the contact provided by the bearings alone. Second, reducing the diameters of the rotating parts, thereby reducing the torque required to turn the rotor.

In my foregoing arrangement the axle of the rotor serves as one contact and an insulated slip ring concentrically mounted in insulated relationship on the axle serves as the other contact. The slip ring turns in an electrically active bearing and is provided with an electrically active spring-loaded brush. The axle likewise turns in an electrically active bearing and is also provided with an electrically active spring-loaded brush. Materials of thermocouple composition (except for solder) are used throughout the respective circuits in order to achieve a high degree of accuracy in temperature readings.

In addition to the foregoing principal objects of the invention, a further object thereof is to provide a rotary contactor for thermocouples of the foregoing type which is improved in the following respect: the amount of materials used therein is substantially reduced, the size is substantially reduced, the leads and connections are located within a compact body member so as to be fully protected.

Certain other additional objects of the invention will in part be obvious and will in part appear hereinafter.

For a more complete understanding of the nature and scope of the invention reference may now be had to the following detailed description thereof taken in connection with the accompanying drawings, wherein:

FIG. 1 is an elevational view of a rotary contactor forming one embodiment of the present invention mounted on one end of a "tin can" container shown in broken lines and equipped with a thermocouple for use in measuring the temperature of the contents in the geometric center of the can;

FIG. 2 is a perspective view, partially cut away and in section, of a post-like rotary sub-assembly constituting one main part of the rotary contactor in FIG. 1;

FIG. 3 is a top plan view of the rotary contactor as shown in FIG. 1;

FIG. 4 is a sectional view taken on line 4—4 of FIG. 3;

FIG. 5 is a bottom plan view partly in section of the rotary contactor of FIG. 1;

FIG. 6 is an end elevational view of a rotary contactor forming a second embodiment of the present invention; and FIG. 7 is a fragmentary partial sectional view taken on line 7—7 of FIG. 6.

Referring to FIG. 1 a connecting means for so-called rotary contactor forming a preferred embodiment of the present invention is indicated generally at 10, being mounted on a fitting 11 of known type mounted in the center of one end of a can 12 shown in broken line. The fitting 11 carries a thermocouple 13 of known commercial type used for heat penetration measurements in a rotary retort. A knurled can coupling nut 14 carried on the rotary contactor device 10 serves to securely attach the rotary contactor to the installed fitting 11 in known manner.

The rotary contactor 10 comprises two subassemblies. One is a post-like rotor sub-assembly 15 which rotates co-axially with the can 12 and the other is a stationary arm sub-assembly 16 which is mounted on and receives therein the upper end of the post-like sub-assembly 15. Reference may now be had to FIGS. 2–5 for a detailed description of the rotary contactor unit 10.

Referring first to FIG. 2, the rotary post-like sub-assembly 15 comprises a base 17 formed of a suitable dielectric material such as glass-filled epoxy resin. Contact pins 18 and 20 are embedded in the base 17. Both contact pins have slotted portions 21 and 22, respectively, projecting from one end of the base 17 which are adapted to matingly connect in the known manner with the terminals of the thermocouple 13. However, the contact pins 18 and 20 will be formed of dissimilar metal compositions corresponding to the dissimilar metals comprising the thermocouple 13. For example, when the dissimilar materials of the thermocouple 13 are Constantan and copper, the longer pin 20 may be formed of Constantan and should, of course, be mated to the Constantan terminal of the thermocouple 13. Contact pin 18 will then be formed of copper and should be matingly connected to the copper terminal of the thermocouple 13. It will be understood that when the thermocouple 13 is made of other different materials, the pins 18 and 20 should likewise be made of different metals so as to correspond thereto.

It will be noted that the longer contact pin 20 has a dog leg configuration with a longer portion 23 thereof being co-axial with the axis of the base 17 and projecting beyond the end of the base 17 for a substantial distance. A sleeve 24 formed of a suitable dielectric material snugly embraces a section of the projecting portion 23 of the pin 20 which is adjacent to the base 17 and projects into the end of the base a short distance as indicated in FIG. 2. On its outer or outboard end the dielectric sleeve 24 is provided with a collar or flange 25 which serves to position a slip ring 26 fitting thereover. The slip ring 26 extends into the adjacent end of the base 17 wherein it is suitably connected by solder to the arcuate end portion 27 of the pin 18. The slip ring 26 will be formed of the same material as the pin 18, i.e. copper.

The projecting portion 23 of the contact pin 20 is supported adjacent the base 17 in a sleeve bearing 28 formed of the same material as the slip ring 26, i.e. copper. A short space from the outer end of the sleeve bearing 28 the slip ring 26 is embraced by a spring-loaded sleeve brush 30 formed of copper and having radially projecting therefrom a copper pin 31 over which fits a compression spring 32.

Adjacent the outer end of the projecting portion 23 of the contact pin 20, it is provided with a second sleeve bearing 33 formed of the same material as the contact pin 20, i.e. Constantan. Juxtaposed to the inner-face of the sleeve bearing 33 is a spring-loaded sleeve brush 34 which may take the form of a plurality of contacting turns of Constantan wire coiled around the pin 20 and provided with a radially projecting Constantan pin 35 which is surrounded by a compression spring 36.

Electrical conductors 37 and 40 formed of copper are provided to electrically inter-connect the sleeve bearing 28 and the pin 31 on the brush 30, respectively, to a copper lead 41 which leads from the rotary contactor device pin to either an indicating or recording type potentiometer. Similarly, a pair of Constantan conductors 42 and 43 electrically inter-connect the sleeve bearing 33 and the pin 35 on the brush 34, respectively, to a second lead 44 leading to the potentiometer. Both of the leads 41 and 44 are sheathed in suitable insulation to form a conductor cord as indicated at 45.

Reference may be had to FIG. 4 for a description of the manner in which the post-like sub-assembly 15 is journaled within the stationary arm sub-assembly 16. The latter sub-assembly comprises an elongated arm member 46 formed of a suitable dielectric material and desirably being rectangular or square in transverse cross-section. The body 46 is provided with aligned openings on opposite sides so as to provide retention seats for the sleeve bearings 28 and 33. A washer 47 is secured on the outermost projecting portion 23 of the contact pin 20 so as to retain the inner-end of the base 17 against the adjacent face of the block 46 as shown. It will be seen that with this arrangement the sub-assembly 15 can rotate within the arm sub-assembly 16.

It will be seen that the interior of the block 46 between the bearings 28 and 33 is in the form of a cavity which houses the spring loaded sleeve brushes 30 and 34 with the compression springs 32 and 36 extending in longitudinal and parallel bores 48 and 50 which are tapped at their outer-ends so as to receive the set screws 51 and 52 respectively. It will be seen that by turning the set screws 51 and 52 the desired amount of compression load can be placed on the springs 32 and 36, it being understood that the minimum compression for satisfactory operation should be used so as to reduce the friction between the brushes and the projecting portions 23 of the pin 20.

It will be seen from FIGS. 4 and 5 that the respective sets of conductors 37–40 and 42–43 extend through transverse openings 53 and 54 respectively to the outside of the block 46 and then inwardly through the second set of transverse openings 55 and 56 respectively wherein they are connected to the leads 41 and 44 respectively. The leads 41 and 44 extend on an angle into the body 46 through the Y shaped opening 57 leading into the bore 58 which receives the adjacent end of the lead cord 45. In order to prevent tension being applied onto the portion of the conductor cord 45 or lead cord 45 within the bore 58 a set screw 60 is positioned in a transverse tapped opening in the body 46 as shown in FIG. 4.

Since both the supporting bearings 28 and 33 and the spring loaded brushes 30 and 34 are electrically active and formed of the same respective materials as the contact pins to which they are electrically connected it will be understood that maximum electrical contact is provided with a minimum of resistance and with a continual cleaning action of the relatively movable parts. By virtue of this arrangement and having the components or parts in the respective electrical paths formed of the same materials as the dissimilar materials of the thermocouple 13 all rotating friction contributes to maintaining continuity of the electrical circuit and only minimal loading of the spring-loaded brushes is required. In fact in some instances the spring-loaded brushes may be omitted. It will also be noted that the diameters of the rotating parts are minimized being the diameter of the projecting portion 23 and the diameter of the slip ring 26.

In use it will be understood that normally several of the rotary contactor units 10 will be applied to a plurality of thermocouple-equipped rigid metal containers 12 supported in a horizontal position for rotation such as in a test or experimental retort of the type represented by a FMC Steritort. The lead wires 41 and 44 of each conductor cord 45 will be connected in known manner through a seal in the hollow shaft of the retort to a suitable slip ring assembly and then to a potentiometer, all in well known manner. The inner or probe end of each thermocouple 13 will normally be in approximately the geometric center of each container 12 so as to sense the temperature of the contents at this point. The resulting voltage or potential created will be impressed upon the contact pins 18 and 20 and transmitted from these pins through their respective associated electrical conducting paths to the lead wires 41 and 44 respectively.

The modification of the rotary contactor of FIGS. 1–5 that is shown in FIGS. 6 and 7 has basically the same construction and corresponding parts are indicated with corresponding reference numerals which are primed. The difference between the rotary contactor unit 10' of FIGS. 6 and 7 and the rotary contactor 10 of FIGS. 1–5 resides in omitting the set screws 51 and 52 for adjusting the compression on the spring-loaded brushes 30 and 34, respectively, and replacing the same with retaining wires 61 and 62 which project through aligned small openings drilled transversely through the body 46 so as to extend through the center portions of the bores 48' and 50'.

It will be appreciated that changes of a design nature may be made in the specific embodiments of the invention shown in FIGS. 1–7. For example, the pins 18 and 20 may be tubular instead of solid in which case the projecting slotted terminal portions 21 and 22 may be omitted and the hollow end portions of the tubular pins used as socket type terminals. In certain instances it may be desirable to have the thermocouple 13 permanently attached to the rotary contact device 10. Other design changes may also be made without departing from the spirit and scope of the invention. The functions of the bearing 28 and brush 30 may be provided by a combination bearing and brush and likewise for the bearing 33 and the brush 34. Thus, these parts 28 and 30 may be combined into a single part and similarly for parts 33 and 34.

I claim:

1. Connector means for use in electrically connecting first ends of a pair of stationary electrical leads to rotary thermocouple terminals mounted on a rotatable container, said thermocouple terminals being on a thermocouple projecting into the interior of said container for sensing the temperature of the contents therein, the second ends of said pair of stationary electrical leads being adapted to be electrically connected to terminals of a potentiometer responsive to voltage generated by said thermocouple, said connector means comprising:
   a post-like rotary sub-assembly having a longitudinal axis about which it is adapted to rotate when said container rotates;
   a stationary arm-like sub-assembly mounted on said post-like rotary sub-assembly;
   said post-like rotary sub-assembly comprising, a base having mounted therein in electrically insulated relationship two contact pins one of which is formed of thermocouple material A corresponding to one material of said thermocouple and the other of which is formed of a different thermocouple material B corresponding to the other material forming said thermocouple, both of said pins having terminal portions at one end of said base for electrical connection with said pair of thermocouple terminals and said contact pin formed of material A projecting axially from the opposite end of said base, a slip ring sleeve formed of material B embracingly mounted in non-conductive relationship on said axially projecting pin portion with the end of said slip ring sleeve adjacent said base being electrically connected to said contact pin formed of material B, first sleeve bearing and/or brush means formed of material B embracing said slip ring sleeve, first conductor means formed of material B electrically connecting said first sleeve bearing and/or brush means to a first end of one of said stationary electrical leads and which is formed of material B, second sleeve bearing and/or brush means formed of material A embracing said projecting pin portion at a location spaced from said slip ring, and second conductor means formed of material A connecting said second sleeve bearing and/or brush means to a first end of the second of said stationary electrical leads and which is formed of material A;

and, said stationary arm sub-assembly comprising, a body member receiving therein said axially projecting pin portion and providing seats for said first and second sleeve bearing and brush means, and said body member providing support for said first and second conductor means and said first ends of said stationary electrical leads.

2. Connector means for use in electrically connecting first ends of a pair of stationary electrical leads to a pair of rotary thermocouple terminals mounted on a rotatable container, said thermocouple terminals being on a thermocouple projecting into the interior of said container for sensing the temperature of the contents therein, the second ends of said pair of stationary electrical leads being adapted to be electrically connected to terminals of a potentiometer responsive to voltage generated by said thermocouple, said connector means comprising:
   a post-like rotary sub-assembly having a longitudinal axis about which it is adapted to rotate when said container rotates;
   a stationary arm-like sub-assembly mounted on said postlike rotary sub-assembly;
   said post-like rotary sub-assembly comprising, a base having mounted therein in electrically insulated relationship two contact pins one of which is formed of thermocouple material A corresponding to one material of said thermocouple and the other of which is formed of a different thermocouple material B corresponding to the other material forming said thermocouple, both of said pins having terminals at one end of said base for mating electrical contact with said pair of thermocouple terminals and said contact pin formed of material A projecting axially from the opposite end of said base, a dielectric sleeve embracing a section of said axially projecting pin portion adjacent said base, a slip ring sleeve formed of material B embracingly mounted on said dielectric sleeve with the end adjacent said base being electrically connected to the adjacent end of said contact pin formed of material B, first sleeve bearing formed of material B embracingly supporting said slip ring adjacent said base, a first spring-loaded sleeve brush formed of material B embracing said slip ring, a first pair of conductors formed of material B electrically connecting said first sleeve bearing and said first spring-loaded sleeve brush respectively to a first end of one of said stationary electrical leads and which is formed of material B, a second sleeve bearing formed of material A embracingly supporting said projecting pin portion at a location spaced from said slip ring, a second spring-loaded sleeve brush formed of a material A embracing said projecting pin portion, and a second pair of conductors formed of material A connecting said second sleeve bearing and said second spring-loaded sleeve brush, respectively, to a first end of the second of said stationary electrical leads and which is formed of material A;

and, said stationary arm sub-assembly comprising, a body member having a transverse opening for receiving therein said axially projecting pin portion with one section of said transverse opening serving as a seat for said first sleeve bearing and with a spaced section thereof serving as a seat for said second sleeve bearing, said body member having space therein for receiving said first and second spring-loaded sleeve brushes and said body member providing support for said first and second pairs of conductors and said first ends of said stationary electrical leads.

3. The connector means called for in claim 2 wherein said base is formed of dielectric material, portions of said contact pins are embedded in said base, and both of said pins have terminals projecting from one end of said base for mating electrical contact with said thermocouple terminals.

4. The connector means called for in claim 2 wherein said body member is formed of dielectric material and adjustable set screws are mounted in tapped openings therein for adjusting the load on said first and second spring-loaded sleeve brushes.

5. The connector means called for in claim 2 wherein non-adjustable means are carried thereby for maintaining predetermined loads on said first and second spring-loaded sleeve brushes.

6. The connector means called for in claim 2 wherein said first and second pairs of conductors are flexible and portions of said stationary electrical leads adjacent said first ends thereof are encased in cord-like insulation extending in a longitudinal passageway in said body member and means is provided on said body member for anchoring said cord-like insulation in said longitudinal passageway.

7. Connector means for use in electrically connecting first ends of a pair of stationary electrical leads to a pair of rotary thermocouple terminals mounted on one end of a rotatable container, said thermocouple terminals being on a thermocouple projecting from said container end into the interior thereof for sensing the temperature of the contents therein, the second ends of said pair of stationary electrical leads being adapted to be electrically connected to terminals of a potentiometer responsive to voltage generated by said thermocouple, said connector means comprising:

a post-like rotary sub-assembly having a longitudinal axis about which it is adapted to rotate when said container rotates;

a stationary arm-like sub-assembly mounted on said post-like rotary sub-assembly;

said post-like rotary sub-assembly comprising, a base having mounted therein in electrically insulated relationship two contact pins one of which is formed of thermocouple material A corresponding to one material of said thermocouple and the other of which is formed of a different thermocouple material B corresponding to the other material forming said thermocouple, both of said pins having terminals at one end of said base so as to mate in electrical contact with said pair of thermocouple terminals and said contact pin formed of material A projecting axially from the opposite end of said base, a dielectric sleeve embracing a section of said axially projecting pin portion adjacent said base, a slip ring sleeve formed of material B embracingly mounted on said dielectric sleeve with the end adjacent said base being electrically connected to the adjacent end of said contact pin formed of material B, a first sleeve bearing formed of material B embracingly supporting said slip ring adjacent said base, a first spring-loaded sleeve brush formed of material B embracing said slip ring, a first pair of flexible conductors formed of material B electrically connecting said first sleeve bearing and said first spring-loaded sleeve brush respectively to a first end of one of said stationary electrical leads and which is formed of material B, a second sleeve bearing formed of material A embracingly supporting said projecting pin portion at a location spaced from said slip ring, a second spring-loaded sleeve brush formed of material A embracing said projecting pin portion, and a second pair of flexible conductors formed of material A connecting said second sleeve bearing and said second spring-loaded sleeve brush, respectively, to a first end of the second of said stationary electrical leads and which is formed of material A;

and, said stationary arm sub-assembly comprising, a body member having a transverse opening for receiving therein said axially projecting pin end with one end of said transverse opening serving as a seat for said first sleeve bearing and with the other end thereof serving as a seat for said second sleeve bearing, and said body member having space therein for receiving said first and second spring-loaded sleeve brushes and having passageway space therein for receiving said first and second pairs of flexible conductors and said first ends and adjacent portions of said stationary electrical leads.

8. For use in connector means for electrically connecting first ends of a pair of stationary electrical leads to rotary thermocouple terminals mounted on a rotatable container, said thermocouple terminals being on a thermocouple projecting into the interior of said container for sensing the temperature of the contents therein, the second ends of said pair of stationary electrical leads being adapted to be electrically connected to terminals of a potentiometer responsive to voltage generated by said thermocouple, a post-like rotary sub-assembly comprising, a base having mounted therein in electrically insulated relationship two contact pins one of which is formed of thermocouple material A corresponding to one material of said thermocouple and the other of which is formed of a different thermocouple material B corresponding to the other material forming said thermocouple, both of said pins having terminal portions at one end of said base for electrical connection with said pair of thermocouple terminals and said contact pin formed of material A projecting axially from the opposite end of said base, a slip ring sleeve formed of material B embracingly mounted in non-conductive relationship on said axially projecting pin portion with the end of said slip ring sleeve adjacent said base being electrically connected to the adjacent end of said contact pin formed of material B, first sleeve bearing and brush means formed of material B embracingly directly supporting said slip ring sleeve, first conductor means formed of material B electrically connecting said first sleeve bearing and brush means to a first end of one of said stationary electrical leads and which is formed of material B, second sleeve bearing and brush means formed of material A embracingly directly supporting said projecting pin portion at a location spaced from said slip ring sleeve, and second conductor means formed of material A for connecting said second sleeve bearing and brush means to a first end of the second of said stationary electrical leads and which is formed of material A.

* * * * *